United States Patent [19]

Roeder

[11] 4,364,095

[45] Dec. 14, 1982

[54] APPARATUS FOR PREVENTING OR ALTERNATIVELY RESTRICTING THE DISCHARGE OF ANIONS AND X-RAYS FROM THE FRONT SIDE OF CATHODE RAY TUBES

[76] Inventor: Helmut R. Roeder, Klosterstrasse 2, 6474 Ortenberg-Selters, Fed. Rep. of Germany

[21] Appl. No.: 214,471

[22] Filed: Dec. 9, 1980

[30] Foreign Application Priority Data

Dec. 11, 1979 [DE] Fed. Rep. of Germany ....... 2949661

[51] Int. Cl.[3] ............................................ H04N 5/65

[52] U.S. Cl. .................................... 358/245; 358/254

[58] Field of Search ............... 358/245, 243, 254, 255; 313/479

[56] References Cited

U.S. PATENT DOCUMENTS

| | | | |
|---|---|---|---|
| 4,045,818 | 8/1977 | Wilhelm | 358/245 |
| 4,191,973 | 3/1980 | Szydlowski | 358/245 |
| 4,246,613 | 1/1981 | Choder | 358/245 |

*Primary Examiner*—Howard Britton

*Attorney, Agent, or Firm*—Mitchell B. Wasson; Martin P. Hoffman

[57] ABSTRACT

On the rear wall of a cathode ray tube a metal disc system is arranged adjacent to the longitudinal axis of the tube, which metal disc system acts as an eddy current brake. The metal disc is substantially vertical to the rear wall, its diameter in a special embodiment is 60 mm and is arranged within a circle of about 500 mm diameter around the longitudinal axis of the tube parallel to the axis of the tube bulb. The metal disc preferably is of conductive metal, for instance aluminium or copper.

8 Claims, 17 Drawing Figures

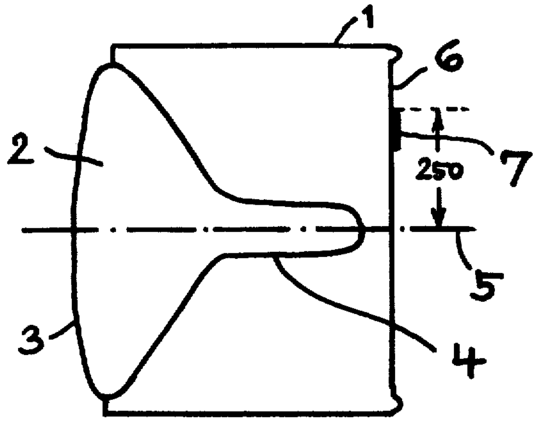
Fig. 1
Fig. 4b
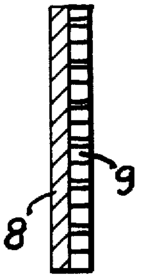
Fig. 4a
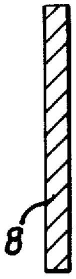
Fig. 2
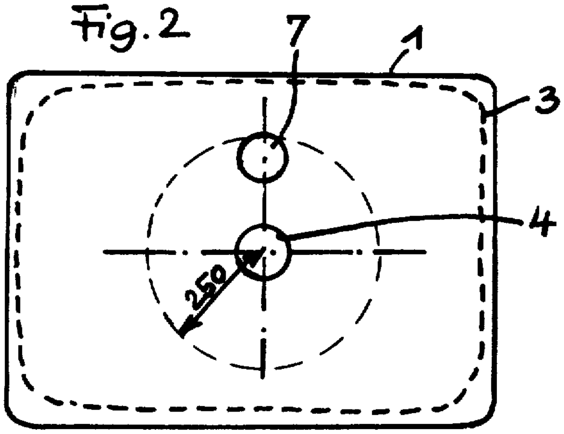
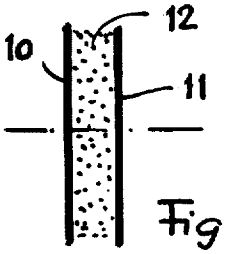
Fig. 3
Fig. 5
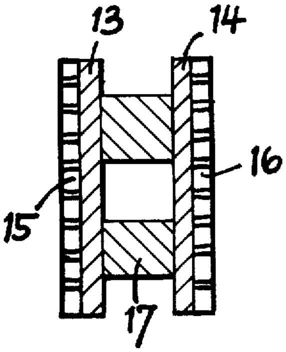

APPARATUS FOR PREVENTING OR ALTERNATIVELY RESTRICTING THE DISCHARGE OF ANIONS AND X-RAYS FROM THE FRONT SIDE OF CATHODE RAY TUBES

BACKGROUND OF THE INVENTION

In the interior of cathode ray tubes, for instance television tubes, picture tubes of data and radar display apparatus or the like, billions of gas atoms are still present in spite of the rather high vacuum. At acceleration voltages of 10 kV and greater, these remaining gas particles are ionized by very fast electrons flowing from the cathode to the screen (anode). This produces positively loaded atoms (cations), which flow towards the cathode and exit at the tube bulb. This concentrated cathode beam extends as far as about 50 m and penetrates thick walls. At the front side of a display tube, anions (negatively charged atoms) are discharged. The discharge is not concentrated, but diffuse. At an acceleration voltage of 25 kV the presence of said anions can still be found at a distance of about 10 m from the front of the display tube. Proof of this can be provided by leaf electrometers or filament electrometers or by measuring the bio-currents on the body of the human being watching the screen. In the past, experiments and investigations have been made to prevent the occurrence of unknown rays of radiation from television sets, which discharge onto the body of the viewer. However, they have not produced any useful results or insight so far.

The ion beams or alternatively anions and X-rays present on the front side of cathode ray tubes have a harmful effect on the human body. Measurements have shown that the human body requires more than 24 hours to build up the charge of the body which has been lost as a result of anion radiation of 10 minutes duration sufficiently to allow the biopotentials to be measured again. This radiation causes transient radiation damage in the human or animal body. Practice shows that radiation damage occurs in television and radar technicians, the origin of which had not previously been explained.

SUMMARY OF THE INVENTION

In the light of this knowledge it is the object of this invention to propose apparatuses for cathode ray tubes which effectively prevent the discharge of anions and X-rays from the screen or alternatively enable the anions to decelerate.

According to this invention this is obtained by providing a metal disc acting as an eddy current brake at the rear wall of the display apparatus adjacent to the longitudinal axis of the tube. Preferably, the eddy-current brake according to this invention consists of a circular metal disc of about 60 mm diameter which is provided approximately vertically on the rear wall of the apparatus within a circle with a radius of $r=250$ mm around the longitudinal axis of the tube next to the bulb of the tube.

The material from which the metal disc is made is conductive metal, for instance aluminium or copper. Instead of a metal disc a metal foil can also be used which is connected to a carrier. With such an arrangement the existence of decelerated anions can be proved up to a distance of about 0.15 m in front of the display screen.

In a further embodiment of the invention it is proposed, in order to improve the effect of such an eddy current brake, that two similar metal discs should be provided parallel to each other with an axial distance of 10 mm from each other. With such a twin eddy current brake, anions up to a distance of about 5 cm are discharged from the screen. Such a twin eddy current brake is of considerable importance especially for data display apparatus or radar screens, because with these apparatuses the viewing distance is extremely short.

Long term experiments have shown that what is achieved with the proposal according to this invention is that the active layers of the display screen of cathode ray tubes age far more slowly if the eddy current brake according to this invention is used.

Biocurrent measurements have proved that the eddy current brake made from an aluminium disc decelerates the anions. The braking effect can be obtained entirely by electromagnetic means, and the condition for that is that magnetic fields, by which the anion in its direction of movement turning clockwise is surrounded generate a current in the disc which causes a magnet field vertical to the magnetic field of the anion. The latter will then be decelerated. The currents on the disc must flow in a radial direction. Concentrical circular currents do not have any effect. In order to prove this, a disc was subdivided into sectors of 15°, and the disc was put together and fixed to a carrier so that the sectors did not come into contact with each other. The effect of a disc divided in such a manner is that of a non-divided disc, namely that the currents flow in a radial direction.

The metal disc constituting the eddy current brake acts as a selective, parasitic antenna. If the diameter of the disc has the value 0 (zero) it resonates at $f_o=5$ GHz and $3\times f_o=\frac{7}{8}\times\delta_o=15$ GHz, if the diameter of the disc is 6 cm. Higher stimulation frequencies are imaginable. However, they do not generate magnetic fields which are effective for decelerating the anions. Therefore, the ions must have an oscillation wave length of 2 to 6 cm.

X-rays respond to a wax disc. Also, the wax disc must be active to current, however, with the corresponding short wave X-ray radiation. There is a relation of the dielectric constant of bees wax. The resonant frequency of the bees wax in the atomic area is at about 15 GHz; the decelerating effect on X-rays is not dependent on the diameter of the wax discs, but is specific to material. The same decelerating effect can already be obtained by a wax disc with a diameter of about 1 cm.

BRIEF DESCRIPTION OF THE DRAWINGS

In the following the invention is explained in connection with the drawing of an embodiment. The figures show:

FIG. 1 is a schematic side view of an apparatus with cathode ray tube comprising an eddy current brake fixed to the apparatus, FIG. 2 an end view of the apparatus according to claim 1, FIG. 3 on an enlarged scale a twin eddy current brake according to this invention, FIGS. 4*a* and 4*b* two different embodiments of eddy current brakes according to FIGS. 1 and 2 on an enlarged scale, FIG. 5 a further embodiment of the twin eddy current brake according to FIG. 3, and FIGS. 6–14 biocurrent measuring curves obtained from practical experiments.

Figure 7:
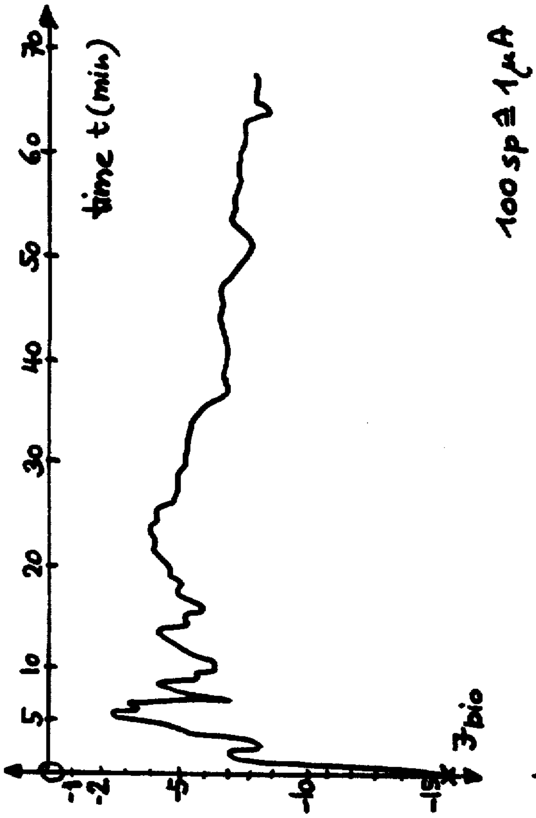

1 is the casing of a display tube set, of for instance a television set, 2 the picture tube, 3 the screen, 4 the tube bulb, 5 the middle axis of the tube 2, 6 the rear wall of the apparatus and 7 the eddy current brake attached to the rear wall. In the shown embodiment and in the test results explained in the following, the eddy current brake is a metal disc with a diameter of 60 mm, the center of which is at a distance of 220 mm from the middle axis 5. The eddy current brake 7 is provided as a circular metal disc of conductive material, of for instance aluminium or copper, as is shown in FIG. 4*a* by a cross-section. However, the disc can also be a metal disc 8, as shown in FIG. 4*b*, and can be provided with a disc 9 of equal size, made from bees wax, which latter disc must be current active in view of the short wave x-rays. The disc 9 made from wax can also be made with a smaller diameter than the metal disc 8.

FIG. 3 shows a twin eddy current brake comprising two parallel metal discs 10 and 11 which are arranged of a distance from each other and are of the same size; the gap 12 between the two discs 10 and 11 is filled with an insulating material, for instance styropor. Also in such a twin disc system each of the metal discs 13 and 14, as shown in FIG. 5, can have an additional disc 15 and 16 of bees wax. The two disc systems 13, 15 and 14, 16 are kept at a distance from each other by means of an insulation 17.

The experiments made with an inventive apparatus were carried out with a Grundig color television set. The measurements were made with a Philips-FET-Mikroamperemeter PM 2503/93, type 1%. The electrodes which were connected to the legs (back of feet) were EKG (electrocardiogram) electrodes made by the firm Hewlett-Packard (silver-nickel-beaker with suction ball). The skin of the test person was covered with conductive vaseline, which is usual with EKG measurements before applying the electrodes. At a viewing distance of 2 m from the television set a biocurrent of −20 scale partitions (100 sp = 1 microampere) was measured at the back of the foot of the test person (left side + pole, right side − pole). When the television set was switched on the biocurrent dropped to about −5 sp (within a time period of 10 minutes, without any eddy current brake). When the television set was used with the inventive eddy current brake this current drop did not materialize. Moreover, it was found that the dog which was present during the measurements and tests no longer avoided the zone in front of the screen when the eddy current brake was used, whereas he did not enter this area when the television set was switched on and no eddy current brake was used.

In order to carry out the measurement, two suction electrodes model No. 65181 (d = 15 mm) of Messrs. Sanborn were used for collecting the current. The material is a nickel-silver alloy. The skin at the places, where the electrodes are applied is coated with Sanborn Redux Creme, a conductive paste. The accuracy of reading of the apparatus, which is provided with a mirror scale, is about ±0.05 sp. The accuracy of measurement is 1%-100 sp (scale portions) correspond to 1 microampere. The electrodes are applied at the back of the feet (plus pole on the left foot). The distances are indicated as the distance between the screen and the back of the chair. The distance between the human body and the screen is then about 0.2 m less than the viewing distance indicated on the curves.

Figure 6:
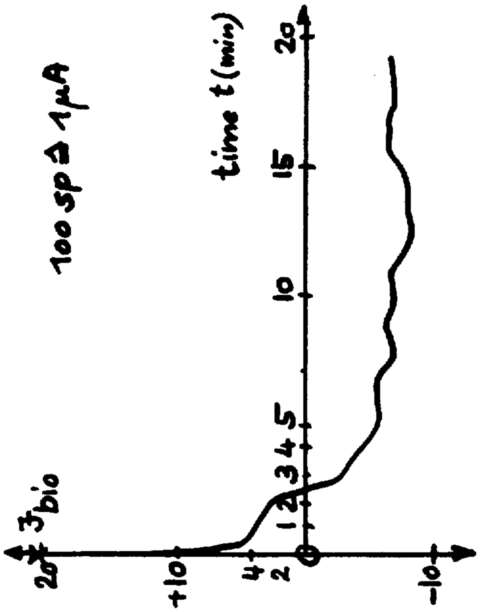

FIG. 6 shows the result of a biocurrent measurement on the following basis: Reference measurement of a test person lying on a couch; foot scanning; plus pole on the right. The place is free from biological interference zones. No stimulating effects. After about 15 minutes a stable steady current of 7 sp is obtained.

FIG. 7 shows the result of a biocurrent measurement similar to FIG. 6. However, before the measurement a stimulus produced by 20 press-ups and 10 knee-bends is generated. After 37 minutes subsequent to initial oscillations a value of −7 to −8 sp as an average value is again obtained.

Figure 8:
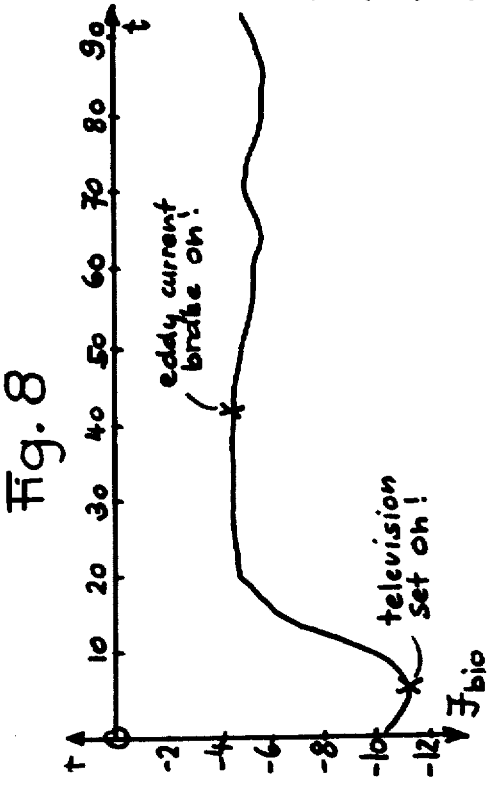

FIG. 8 shows results of a biocurrent measurement based on the following conditions: Foot discharge, plus pole on the right. Two meter viewing distance from the television set, 1.8 m distance of the body. Test person sitting. Influence area of anion rays and X-rays. The potential subsequent to switching on the television set falls from −11.5 sp after 20 minutes to −4.5 sp. When the eddy current brake is switched on which merely removes the anion stimulus, the potential increases slightly.

Figure 9:
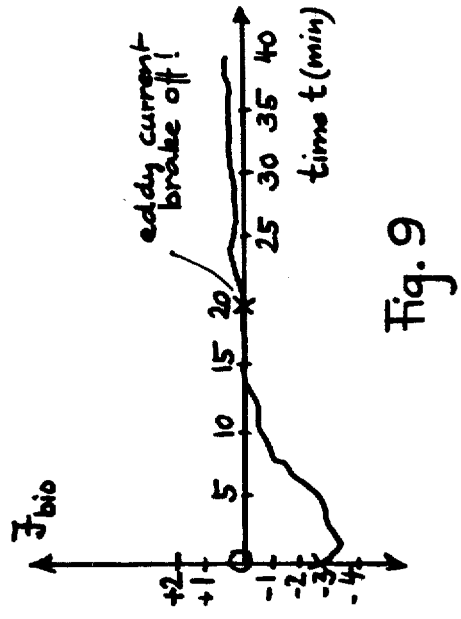

FIG. 9 shows results of a biocurrent measurement with foot discharge; plus pole on the right, viewing distance 2.0 m. In spite of the switched-on eddy current brake the current tends towards ±0. This means deploarization of the body or discharge by hard rays (X-rays).

Figure 10:
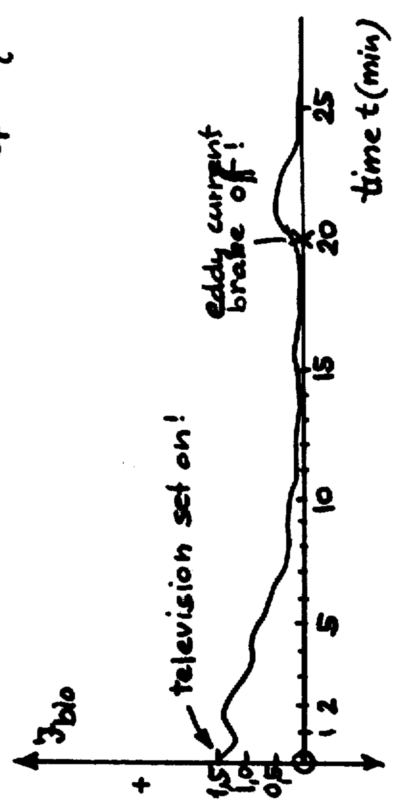

FIG. 10 shows the result of a biocurrent measurement with foot discharge; plus pole on the right. Viewing distance shortened to 1.6 m, with the test person sitting in front of the television set. Current tends toward ±0. Confirmation of X-rays. After 20 minutes the eddy current brake is removed. The anions, which act in addition now, result in slight deflection (0.5 sp) to the positive area. Depolarisation is maintained, current at ±0.

Figure 11:
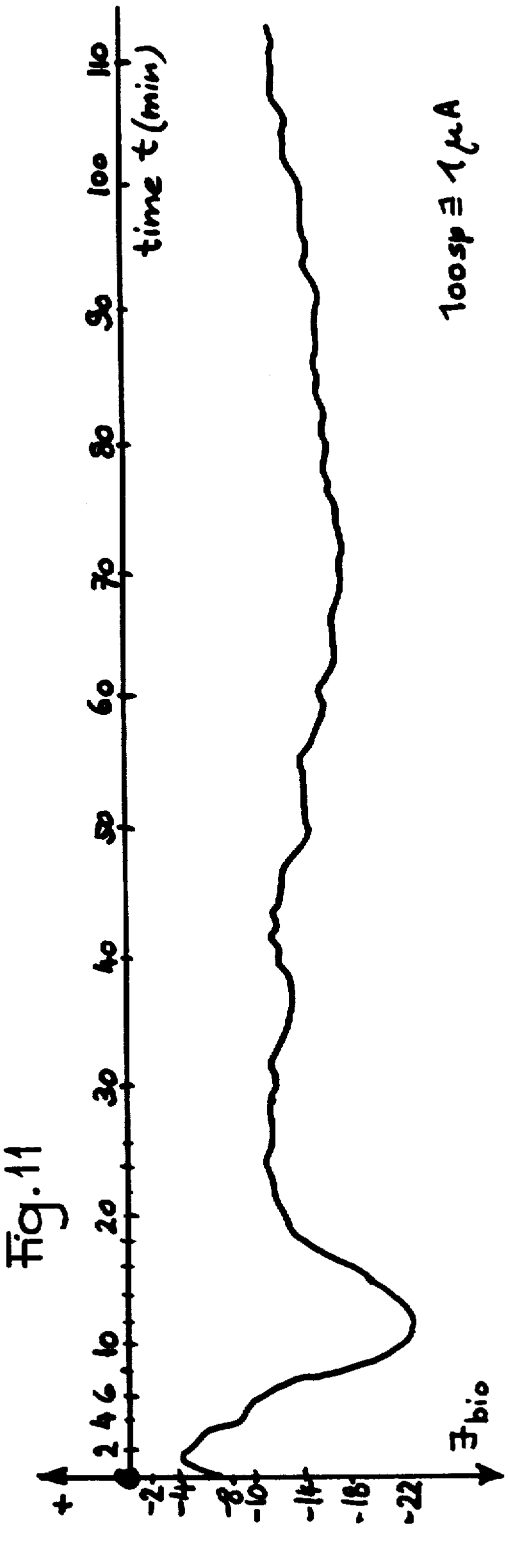

FIG. 11 shows the result of a biocurrent measurement with foot contact; plus pole on the right. 1.0 m viewing distance, test person sitting. The protection device is modified and the eddy current brake (aluminium disc, diameter d = 60 mm) is coated on one side with bees wax. This arrangement is characterised as "combined eddy current brake", which prevents the exit of anion and X-rays from the front side of the cathode ray tube or alternatively decreases it. The biocurrent oscillates in a complete period until minute 20. Afterwards, a quasi-stationary condition is obtained. The oscillations are very weak. This means that no stimulus results. After 120 minutes the current has a value of −8 scale portions. This corresponds to the value "body at rest" (see measurements according to FIGS. 6 and 7). During the entire time there is not transport of charge from or to the body.

Figure 12:
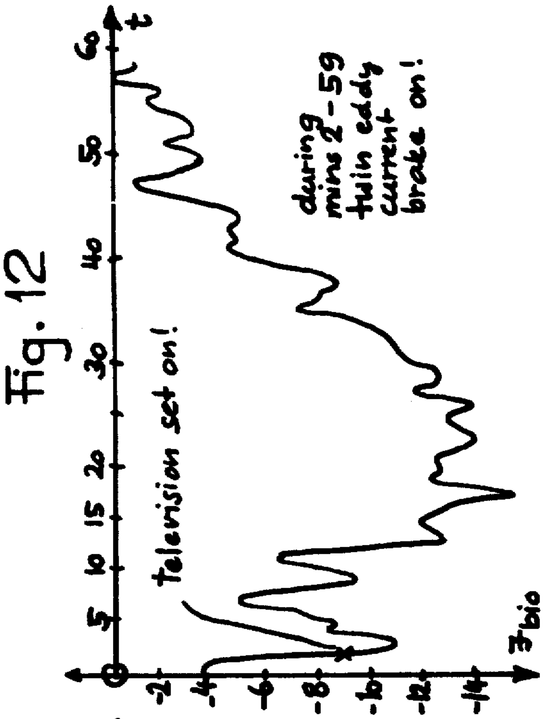

FIG. 12 shows the result of a biocurrent measurement with foot discharge, plus pole on the right. This tests the area which is extremely close. The distance between the screen and the back of the sitting test person is 2 cm. The curve shows strong oscillations by stimulating effects. At minute 57 the body is discharged as a result of X-rays. With this test a double combination (tandem structure) of the eddy current brake is used. It is to be expected that the stimulus by X-rays and anion rays with the simple arrangement of the protection device (an aluminum disc coated with wax) will reach 0.4 m. With the tandem system (two coated discs at a distance of 10 mm from each other) this distance should be halved to 0.2 m. It is tested by measurement at a distance of 0.3 m (back towards the screen) as soon as the body of the test person is on potential again.

Test person sitting with his back towards the television set. Double combined eddy current brake switched-on (tandem structure). The curve goes up and down steadily (oscillation) as a result of the stimulating effects of the anion X-rays. At minute 57 a complete withdrawal of the charge from the body is obtained. Depolarisation. The protective distance of 2 m is not guaranteed. Measurements at 0.3 m distance from the back, show the same picture (curves are not shown).

Figure 13:
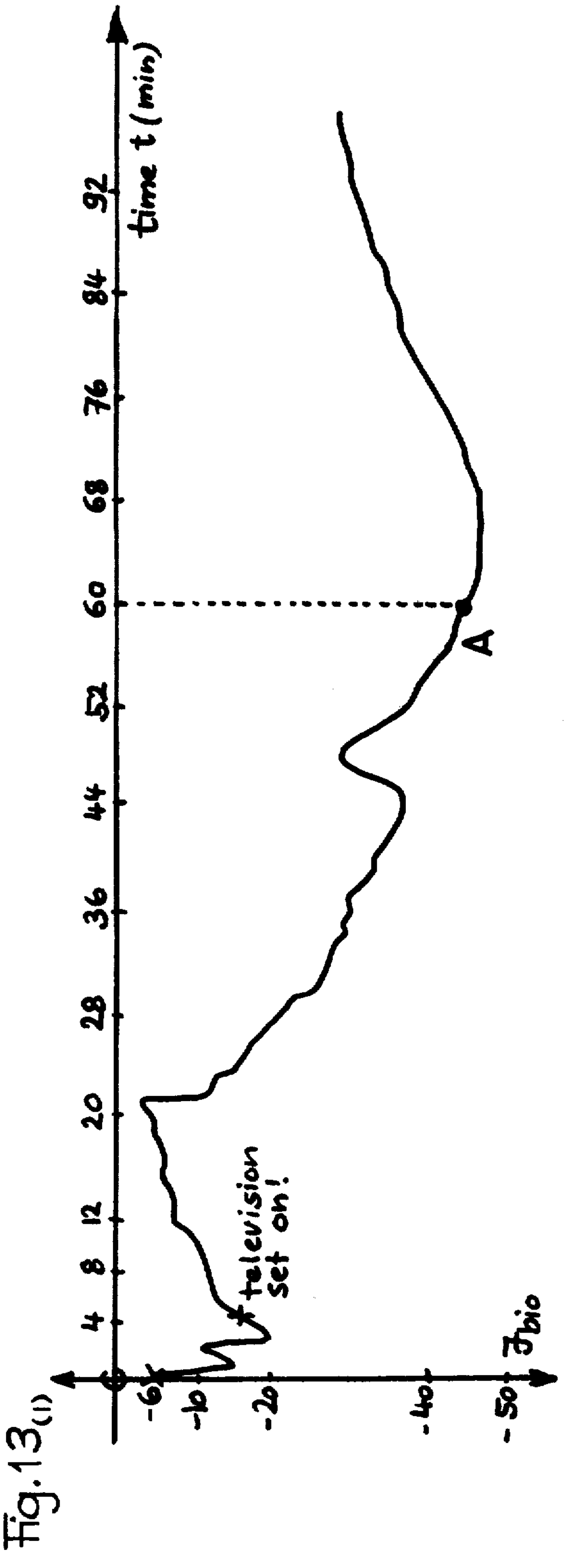
Figure 13:

FIG. 13 shows the result of the biocurrent measurement with foot discharge; plus pole on the right. Test person sitting. Distance from the back 0.5 m. Protective device as in FIG. 12. The curve does not oscillate. No discharge nor charge. Curve is stable at minute 130 with about −17 sp. The protective distance of 0.5 m is met. The true protective distance is probably 0.4 m, because with a measurement at a distance of 1.0 m the face and legs had been facing the television set. The distance between the knees and the television set was 0.4 m.

Figure 14:
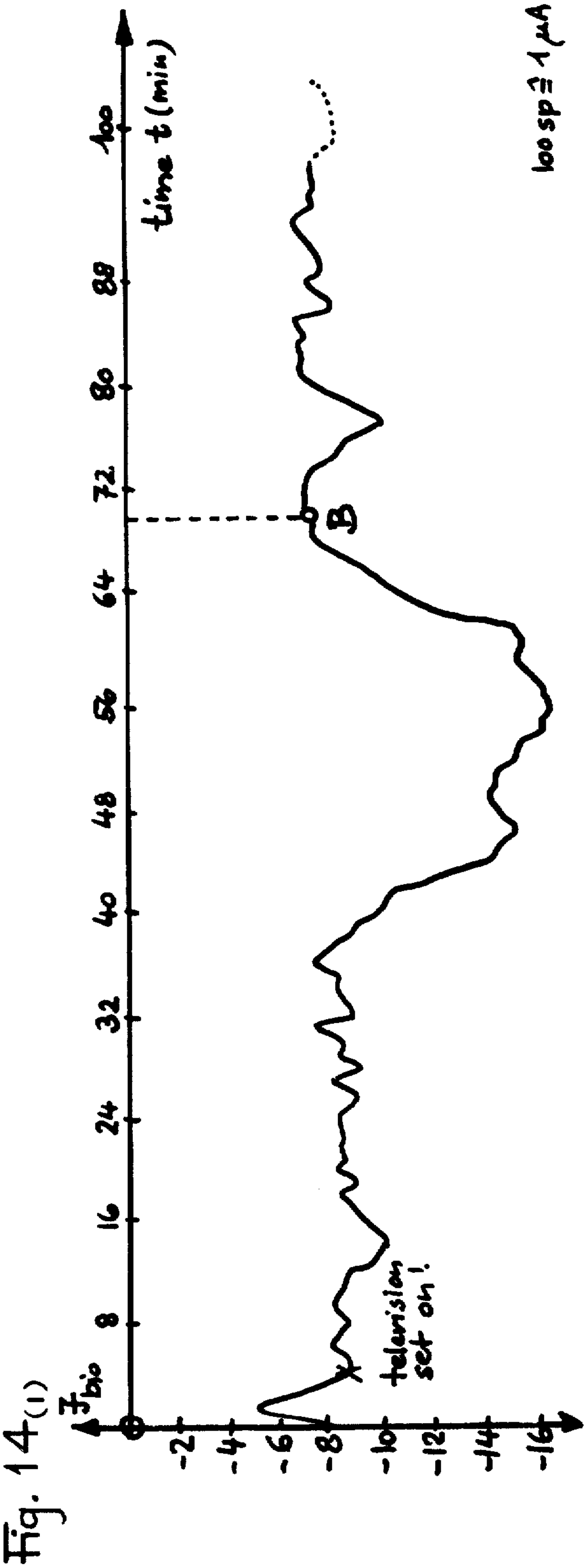
Figure 14:
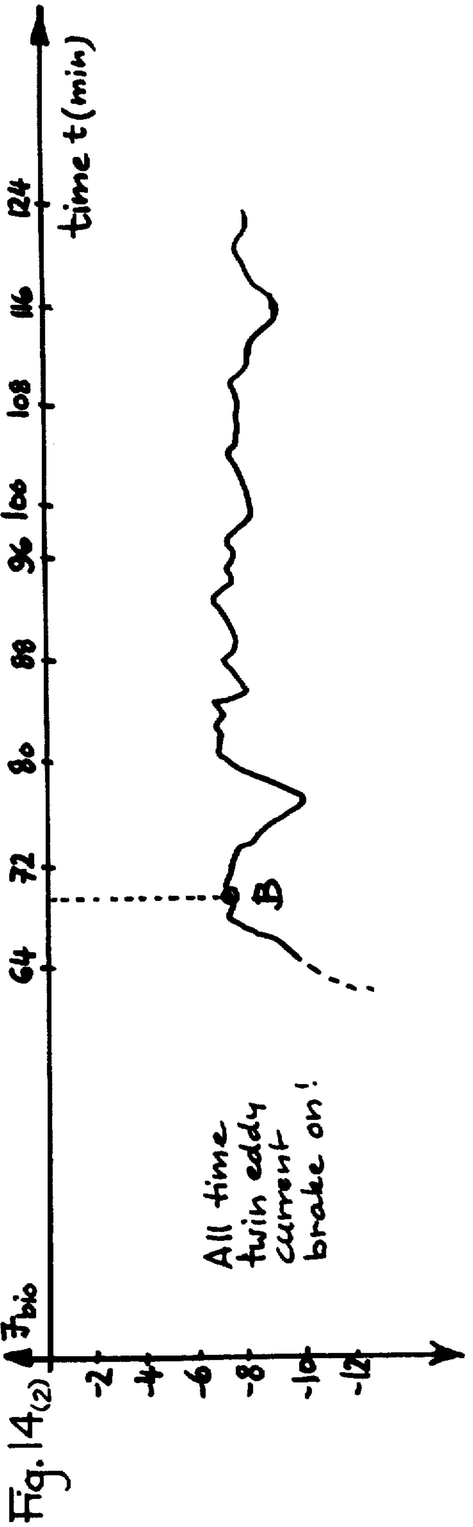

FIG. 14 shows the results of a biocurrent measurement with foot discharge; plus pole on the right. Test person sitting. Distance from the back 0.3 m. Protective device extended.

Altogether four wax-coated aluminium discs, distance of the discs from each other 10 mm. The curve does not show any depolarization in the positive area or discharge to ±0. The biocurrent is substantially stable at minute 81 with an average value of about −7.5 sp. The protective distance is 0.3 m. A measurement at a distance of 0.25 m already shows depolarization.

While there have been described particular embodiments of the present invention, it is apparent that changes and modifications may be made therein without departing from the invention in its broader aspects. The aim of the appended claims, therefore, is to cover all such changes and modifications as fall within the true spirit and scope of the invention.

What is claimed is:

1. An apparatus for preventing or alternatively decreasing the discharge of anions and x-rays at the front screen of cathode ray tubes, the tubes including a rear wall, comprising:

a disc system affixed to the rear wall of the cathode ray tube adjacent to the longitudinal axis of the cathode ray tube outside of the cathode, whereby said disc system acts as an eddy current brake.

2. An apparatus according to claim 1 wherein said disc system includes a metal disc consisting of a conducting metal such as aluminium or copper.

3. An apparatus according to claim 2, wherein said disc system is formed in a circular manner and has a diameter of about 60 mm.

4. An apparatus according to claim 3, wherein said disc system is arranged within a circle of r=250 mm around the longitudinal axis of the tube staggered in view of the tube bulb.

5. An apparatus according to claim 1, wherein said disc system consists of two parallel identically sized, opposite metal discs which are connected to each other by an insulating material.

6. An apparatus according to claim 3 or 4, wherein said disc system consists of two parallel identically sized, opposite metal discs which are connected to each other by an insulating material.

7. An apparatus according to claim 1 wherein said disc system includes a disc formed from bees wax.

8. An apparatus according to claim 1 wherein said disc system consists of two parallel identically sized, opposing discs which are connected to each other by an insulating material, said discs formed from bees wax.

* * * * *